United States Patent [19]

Herrero

[11] 4,139,665
[45] Feb. 13, 1979

[54] PACKAGING MATERIAL
[75] Inventor: Francisco Herrero, Hamburg, Fed. Rep. of Germany
[73] Assignee: Lever Brothers Company, New York, N.Y.
[21] Appl. No.: 842,768
[22] Filed: Oct. 17, 1977

Related U.S. Application Data

[63] Continuation of Ser. No. 659,436, Feb. 19, 1976, abandoned.

[30] Foreign Application Priority Data

Feb. 21, 1975 [GB] United Kingdom ............... 7465/75

[51] Int. Cl.² ..................... B65D 35/08; B32B 27/08
[52] U.S. Cl. ................................. 428/35; 222/107; 428/36; 428/518; 428/520; 428/215
[58] Field of Search ............... 428/35, 520, 518, 36, 428/215; 222/107

[56] References Cited

U.S. PATENT DOCUMENTS

| | | | |
|---|---|---|---|
| 2,893,908 | 7/1959 | Antlfinger | 428/520 |
| 3,453,173 | 7/1969 | Isley | 428/520 |
| 3,606,958 | 9/1971 | Coffman | 428/515 |
| 3,823,850 | 7/1974 | Holoubeck | 222/107 |
| 3,908,070 | 9/1975 | Auerswald | 428/520 |
| 4,015,033 | 3/1977 | Nield | 428/35 |

*Primary Examiner*—Ellis Robinson
*Attorney, Agent, or Firm*—Kenneth F. Dusyn; James J. Farrell; Melvin H. Kurtz

[57] ABSTRACT

A laminate comprising an inner and an outer water vapor barrier layer and an intermediate flavor and oxygen barrier layer of a thermoplastic material with a high nitrile content provides for a packaging material for perfumed and flavored compositions, e.g. a dentifrice-tube.

5 Claims, No Drawings

PACKAGING MATERIAL

This is a continuation of application Ser. No. 659,436, filed 2-19-76, now abandoned.

The present invention relates to a laminar packaging material, adapted to serve as packaging material per se as well as to form particular containers for packaging purposes therefrom. In particular it relates to film- or sheet-like packaging materials and particular containers made therefrom, suitable for packing flavoured or perfumed substances to be packed therein, such as foodstuffs, beverages, cosmetics like shampoos, dentifrices and the like.

Packaging materials suitable for packing flavoured or perfumed substances should have a sufficiently low permeability with regard to the flavour or perfume components. It should furthermore have a low permeability to oxygen, thus preventing flavour or perfume oxidation, as well as a low moisture permeability, thus preventing drying out of the substances packed. When film- or sheet-like packaging materials are to be formed into particular containers, such as bags, pouches, sachets, bottles or tubes, they should have a good sealability, especially to the nozzle if the container is to be provided with a nozzle and they should have an appropriate stiffness to impart sufficient rigidity to the containers.

It has now been found that a laminar packaging material which comprises a laminate of three layers as defined more specifically below provides a packaging material for flavoured or perfumed substances with improved moisture, oxygen and flavour barrier properties.

The laminate of three layers consists of an inner moisture or water vapour barrier layer, an intermediate flavour and oxygen barrier layer and an outer moisture or water vapour barrier layer.

The inner layer should be made of material which contributes to the required rigidity of a container made from the packaging material, and which is also resistant to attack arising from contact with the substances to be packed. Polypropylene is a preferred material for making the inner layer, but other materials, such as sealable vinylchloride polymers and copolymers and the like, may also be used. When a particular container is made from the packaging material of the present invention, e.g. a tube with a nozzle, the polypropylene inner layer provides for a heat-sealable layer enabling to seal the bottom of the tube after filling, to make the back seam of the tube, and to join the barrel to the tube-nozzle.

The outer layer is preferably made from the same material as the inner layer, e.g. polypropylene, but it may also be prepared from other materials, e.g. sealable vinylchloride (co)polymers. If the inner and/or outer layer(s) are/is not (sufficiently) heat-sealable, they may be coated with a heat-sealing lacquer. The inner and outer layers do not only function as moisture/water vapour barrier, but also support and improve the flavour and oxygen barrier function of the laminate.

The intermediate layer is made from particular thermoplastic materials having a low oxygen and flavour permeability. These thermoplastic materials are acrylonitrile copolymers with a high nitrile content, e.g. acrylonitrile/styrene/butadiene copolymers as described in British Patent Specification No. 1,186,305, and German Patent Application No. 2,250,346.

A preferred material is LPT ex ICI Ltd, available as Grade JLR and Grade BLS. Other suitable materials with a high nitrile content are Barex resins, ex Vistron Corp., a nitrile-rubber-modified acrylonitrile methyl acrylate copolymer containing 73–77 parts by weight of acrylonitrile, 27–23 parts by weight of methyl acrylate in the presence of 8–10 parts by weight of a butadiene-acrylonitrile copolymer, which is about 70% by weight derived from butadiene, and Lopac resins ex Monsanto, which are modified methacrylonitrile-styrene copolymers containing e.g. 86% acrylonitrile and 13% styrene. Other examples are an acrylonitrile-rich copolymer of styrene, toughened with a styrene-butadiene rubber, coded NR-16 ex E. I. du Pont de Nemours, further described in Applied Polymer Symposium No. 25 (1974), pages 293–299, and the copolymer Cycopac$^{200}$ ex Borg-Warner, which contains about 76% acrylonitrile and about 24% styrene. In general the acrylonitrile content is above 70%, e.g. from 73–93%. This intermediate layer also contributes to the required rigidity of a container made from the packaging material of the invention, in addition to forming an oxygen and flavour barrier layer.

In a preferred embodiment of the present invention the laminar packaging material comprises a laminate of an inner and an outer polypropylene layer, and an LPT layer between the inner and outer propylene layers.

The thickness of the laminar packaging material is of course governed by the purpose for which it is used. For flexible packaging purposes it may be rather thin, and for making packaging containers it should be sufficiently thick to give the required rigidity. Thus, for example, for a tube suitable for toothpastes a total thickness of about 100–400, e.g. 300 microns, in satisfactory, the intermediate layer having a thickness ranging from 10–100 microns. The thickness of the inner and the outer layer may be varied as desired, e.g. between 50 and 200 microns. They may have the same or a different thickness.

The laminate of the present invention can be made in any convenient manner. Thus the intermediate layer can be made by making a film of the thermoplastic material by blowing, extrusion or calendering. The inner and the outer layer can be adhesive-laminated to the inner layer with a suitable adhesive e.g. a two-component adhesive, or the inner, intermediate and outer layers can be co-extruded in one process. In order to avoid possible delamination of the inner and/or outer layer from the intermediate layer, the inner and/or outer layer can be sealed around the exposed edge of the laminate. Delamination can also be obviated by means of e.g. the Combitube method by Tubmatic.

The laminate of the present invention can be manufactured in reel form, the outer layer being a printable layer. The material can then be used as such for packaging purposes, particularly for flexible packaging purposes such as the vacuum-packaging or flavoured foodstuffs, for hermetically closed packaging purposes and the like. The material can also be formed into particular containers, and a preferred embodiment of such a container is a tube for packing toothpaste, e.g. a plastic transparent toothpaste tube. For this purpose the laminate is formed into a barrel, to which a preformed nozzle may be sealed, or onto which a nozzle may be directly injection-moulded by means of a suitable injection-moulding process, e.g. the Tubmatic or Tuboplast process.

The invention will further be illustrated by way of Example.

EXAMPLE I

A laminate, comprising an outer and an inner layer of polypropylene (PP), each with a thickness of 80 microns, and an intermediate layer of an acrylonitrile/styrene/butadiene copolymer, LPT ex ICI as described above, with a thickness of 50 microns, was made as follows:

The sheets, from which the laminate was formed, were pretreated by means of Corona-discharge in a Demes equipment, during which surface-tension of 48 dynes/cm for PP and 52 dynes/cm for LPT were used. Subsequently the sheets were laminated together in a Dixon-coater at a velocity of abt. 5 m/min., with a two-component adhesive, to form a laminate PP/adhesive/LPT/adhesive/PP. The laminate was subsequently dried at 75° C, and was thereafter allowed to further dry for 4–5 days at room temperature.

The laminate thus obtained was formed into flat pouches having a longitudinal sealing seam of 10 cm and a bottom sealing seam of 5 cm. Part of the pouch was filled with an undiluted flavouring composition and, after sealing of the closing or top seam, stored for 2 months at 23° C. The flavouring composition used for this purpose was a flavouring composition from a commercial toothpaste. A further group of the pouches was filled with a toothpaste and, after sealing of the top seam, also stored at 23° C, but for a period of 12 months. The toothpaste had been flavoured with the flavouring composition mentioned. In order to evaluate the sealing and delamination strength before and after storage and the degree in which this strength had been affected by the prolonged contact with the above-mentioned filling materials, some of the stored pouches were emptied and cut into strips of 1.5 cm thickness. The testing of the sealing seam strength and the laminating strength was effected by means of a tensile testing machine at 23° C and at a testing speed of 100 mm/min. The results are given in Table 1.

Table 1 also comprises the permeability rates of the pouches with respect to water vapour, oxygen and carbon dioxide. These rates were determined by means of the isostatic method specific for measuring gas, described in "Materialprüfung" 11, 166 (1969), and in "Fette - Seifen - Anstrichmittel" 76, 469 (1974) exemplied with regard to water vapour permeability. The water vapour measurements were effected at 23° C and a partial pressure fall of the water vapour of 13.6 mmHg (65% R.H.). The measurements of the oxygen and carbon dioxide permeability rates were carried out at 23° C and with the pure gases under the following appr. practical conditions: 100% R.H. inside the pouch and 65% R.H. outside the pouch.

TABLE 1

Sealing seam and delaminating strength of the combination of materials 80 microns PP/50 microns LPT/80 microns PP, and barrier properties of the flat pouches obtained therefrom

|  | Original after storage for 4–5 days at 23° C | After 2 months' storage in contact with undiluted flavouring composition | After 1 year storage in contact with toothpaste |
|---|---|---|---|
| Sealing seam strength (Newton/1.5 cm) | 17 | 15 | 15 |
| Delaminating strength (Newton/1.5 cm) |  |  |  |
| inner adhesive layer | 8 | 7.6 | 7.6 |
| outer adhesive layer | 11 | 10 | 10 |
| Permeability rates +) for |  |  |  |
| a) water vapour (g/day) | 0.0015 | 0.0015 | 0.0015 |
| b) oxygen $\frac{\text{cubic cm s.t.p.}}{\text{day/atm}}$ | 0.03 | 0.03 | 0.03 |
| c) carbon dioxide $\frac{\text{cubic cm s.t.p.}}{\text{day/atm}}$ | 0.06 | 0.06 | 0.06 |

+)These permeability rates also comprise possible leakages in the sealing seams.

The results of this Table show that neither the sealing seam strength nor the laminate strength of the pouch material have appreciably changed as a result of the storage in contact with flavouring substances and with toothpaste. Also the very slight permeability of the pouches with respect to water vapour, oxygen and carbon dioxide was maintained.

A sensoric testing of the toothpaste samples which had been stored for 10 months in the sealed pouches at 23° C showed that quality and flavour retention were unchanged.

EXAMPLE 2

Similar results were obtained with the following laminates:

```
50 microns PP/  40 microns LPT/  50 microns PP
100 microns PP/  90 microns LPT/100 microns PP
200 microns PP/100 microns LPT/100 microns PP
```

I claim:

1. A laminar packaging comprising a laminate consisting of an inner and an outer moisture and water vapor barrier layer, each barrier layer having a thickness of 50–200 microns and being selected from the group consisting of polypropylene, vinylchloride polymers and vinylchloride copolymers, and an intermediate flavor and oxygen barrier layer having a thickness of 10—100 microns, wherein the latter consists of a thermoplastic acrylonitrile copolymer with a nitrile content of 70–93% by weight selected from the group consisting of acrylonitrile/styrene copolymer, methacrylonitrile/styrene copolymer, acrylonitrile/styrene/butadiene copolymer, and acrylonitrile/methyl acrylate/butadiene copolymer.

2. The laminar packaging material of claim 1 wherein the thermoplastic copolymer is an acrylonitrile/styrene/butadiene copolymer with a nitrile content of 70–93% by weight of the copolymer.

3. The laminar packaging material of claim 2, wherein the inner and outer layers are made from polypropylene.

4. A container suitable for packing flavored or perfumed substances, made from the laminar packaging material of claim 1.

5. A toothpaste tube comprising a barrel made from the laminar packaging material of claim 1.

* * * * *